US012294187B2

(12) United States Patent
Liu et al.

(10) Patent No.: US 12,294,187 B2

(45) Date of Patent: May 6, 2025

(54) ELECTRICAL CONNECTOR WITH AN IMPROVED GROUNDING MEMBER AND AN IMPROVED METAL SHELL

(71) Applicants: FUDING PRECISION INDUSTRY (ZHENGZHOU) CO., LTD., Zhengzhou (CN); FOXCONN INTERCONNECT TECHNOLOGY LIMITED, Grand Cayman (KY)

(72) Inventors: Meng Liu, Kunshan (CN); Xiao-Li Liu, Kunshan (CN); Ling Zong, Kunshan (CN); Zhan-Sheng Meng, Kunshan (CN)

(73) Assignees: FUDING PRECISION INDUSTRY (ZHENGZHOU) CO., LTD., Zhengzhou (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 383 days.

(21) Appl. No.: 17/972,140

(22) Filed: Oct. 24, 2022

(65) Prior Publication Data

US 2023/0128860 A1 Apr. 27, 2023

(30) Foreign Application Priority Data

Oct. 26, 2021 (CN) .......................... 202111245110.0

(51) Int. Cl.
*H01R 13/6585* (2011.01)
*H01R 12/75* (2011.01)

(52) U.S. Cl.
CPC ......... *H01R 13/6585* (2013.01); *H01R 12/75* (2013.01)

(58) Field of Classification Search
CPC ........ H01R 12/71; H01R 12/72; H01R 12/75; H01R 13/658; H01R 13/6581; H01R 13/6585; H01R 13/6586; H01R 13/6587
USPC ..................................................... 439/607.05
See application file for complete search history.

(56) References Cited

U.S. PATENT DOCUMENTS

| | | | |
|---|---|---|---|
| 11,398,693 B2 | 7/2022 | Yang et al. | |
| 2020/0266584 A1 | 8/2020 | Lu | |
| 2021/0218201 A1 | 7/2021 | Lv et al. | |
| 2021/0408732 A1 | 12/2021 | Chen et al. | |
| 2023/0128860 A1* | 4/2023 | Liu | H01R 13/6586 439/607.05 |

FOREIGN PATENT DOCUMENTS

| | | |
|---|---|---|
| CN | 206422325 U | 8/2017 |
| CN | 206673232 U | 11/2017 |

* cited by examiner

*Primary Examiner* — Khiem M Nguyen
(74) *Attorney, Agent, or Firm* — Ming Chieh Chang

(57) ABSTRACT

An electrical connector includes a housing having a base portion and a tongue portion, two rows of terminals having signal terminals and ground terminals, a grounding member, and a metal shell. The grounding member is formed by bending a metal plate to have two long plates with fingers in contact with corresponding ground terminals. The base body defines a mating face and an outer face. A positioning groove is formed between a first side plate and the outer wall face. The metal shell is provided with an inner plate of which the lower edge is cut into a specific shape to form a locking edge. The metal shell has an inner shell and an outer shell.

18 Claims, 16 Drawing Sheets

ELECTRICAL CONNECTOR WITH AN IMPROVED GROUNDING MEMBER AND AN IMPROVED METAL SHELL

BACKGROUND OF THE INVENTION

Field of the Invention

The present invention relates generally to an electrical connector, particularly to an electrical connector with an improved grounding member and an improved metal shell.

Description of Related Arts

China Patent Application Publication No. 113422234 discloses a high-speed IO connector with an improved terminal co-planarity. The connector comprises at least two rows of terminals arranged at intervals, a housing for retained the terminals, and a shell covering the housing. There are at least two rows of short piles on the face of a rear end of the housing, and each row of the short piles is press-fitted with a surface-mounted end of a row of terminals to ensure the co-planarity of the terminals at the surface-mounted ends. A mesh shielding sheet is also arranged between the two rows of terminals, through which the electrical connection of all the ground terminals is made. However, the mesh shielding sheet cannot satisfy an electrical performance and has a poor contact with the terminals in the signal transmission with higher and higher speed. The locking holes of the shielding shell destroy an integrity of the shielding shell.

In conclusion, it is indeed necessary to improve the existing electrical connector.

SUMMARY OF THE INVENTION

The objective of the present invention is to provide an electrical connector that has an improved grounding member and an improved metal shell.

To achieve the above object, an electrical connector is provided, an electrical connector, comprising a housing comprising a base portion and a tongue portion extending from the base portion; two rows of terminals retained in the housing, each row of terminals comprising signal terminals and ground terminals, the terminals comprising contacting portions and connecting portions, the contacting portions being respectively arranged on opposite surfaces of the tongue portion respectively; and a grounding member retained in the housing and located between the two rows of terminals; wherein the grounding member is formed by bending a metal plate and comprises two long plates and an arc portion integrally connecting the two long plates, each of the long plates defines a plurality of fingers which are in contact with the corresponding ground terminals, respectively.

Other advantages and novel features of the invention will become more apparent from the following detailed description of the present embodiment when taken in conjunction with the accompanying drawings.

DETAILED DESCRIPTION OF THE PREFERRED EMBODIMENT

Figure 1:
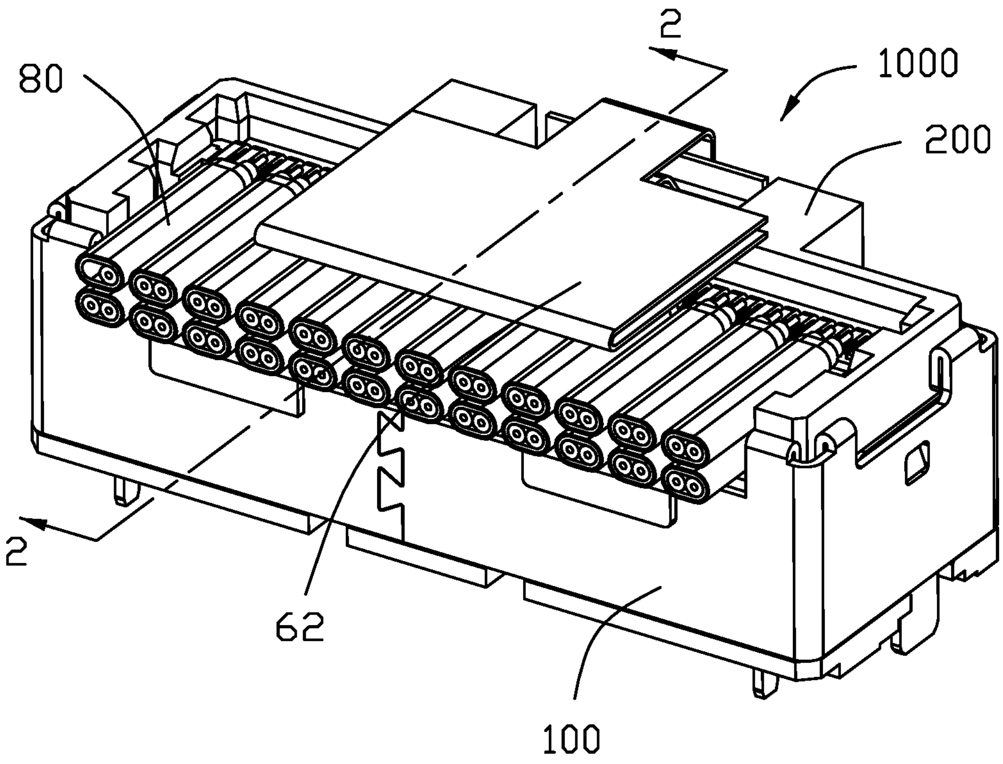
FIG. 1 is a perspective view of an electrical connector assembly including a board connector and a cable connector mated with each other.
Figure 2:
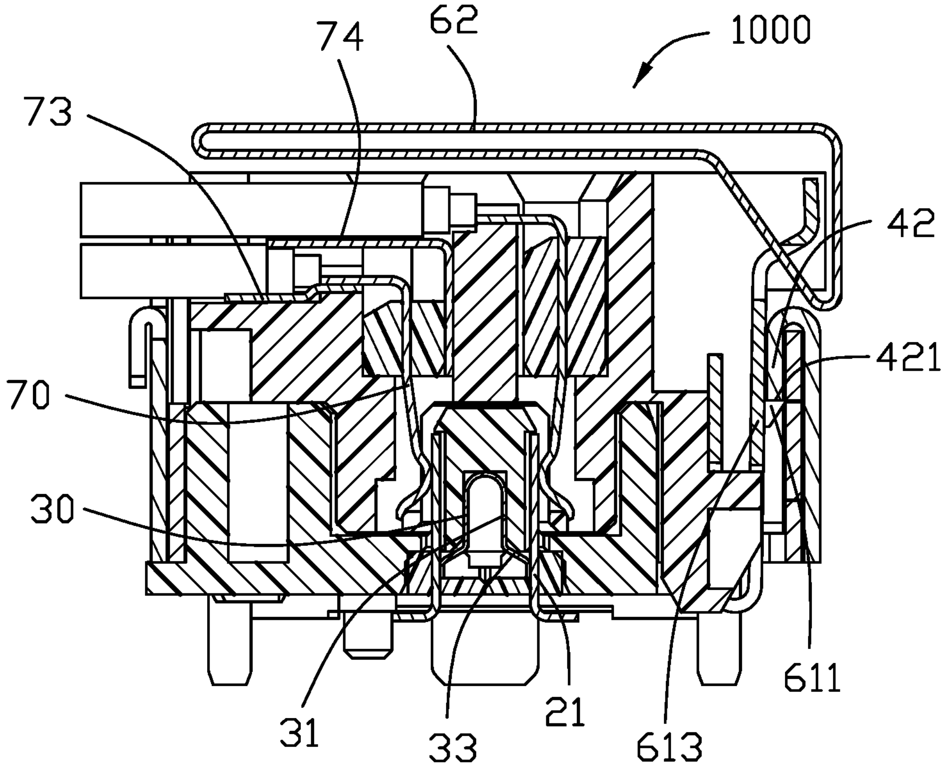
FIG. 2 is a cross-sectional view of the electrical connector assembly of FIG. 1 taken along line 2-2.

Referring to FIGS. 1-2, an electrical connector assembly 1000 of a first embodiment of this present invention, includes a board connector 100 which is used to be mounted on a circuit board, and a cable connector 200 connected with cables 80 at a rear end thereof. The cable connector 200 is inserted into and locked with the board connector 100 by a locking member 61, thereby achieving a high-frequency signal transmission, and the cable connector 200 is unlocked and disconnected from the board connector 100 by pulling a pull strap 62 to release the locking member 61. The specific structure will be described in detail hereinafter.

Figure 3:
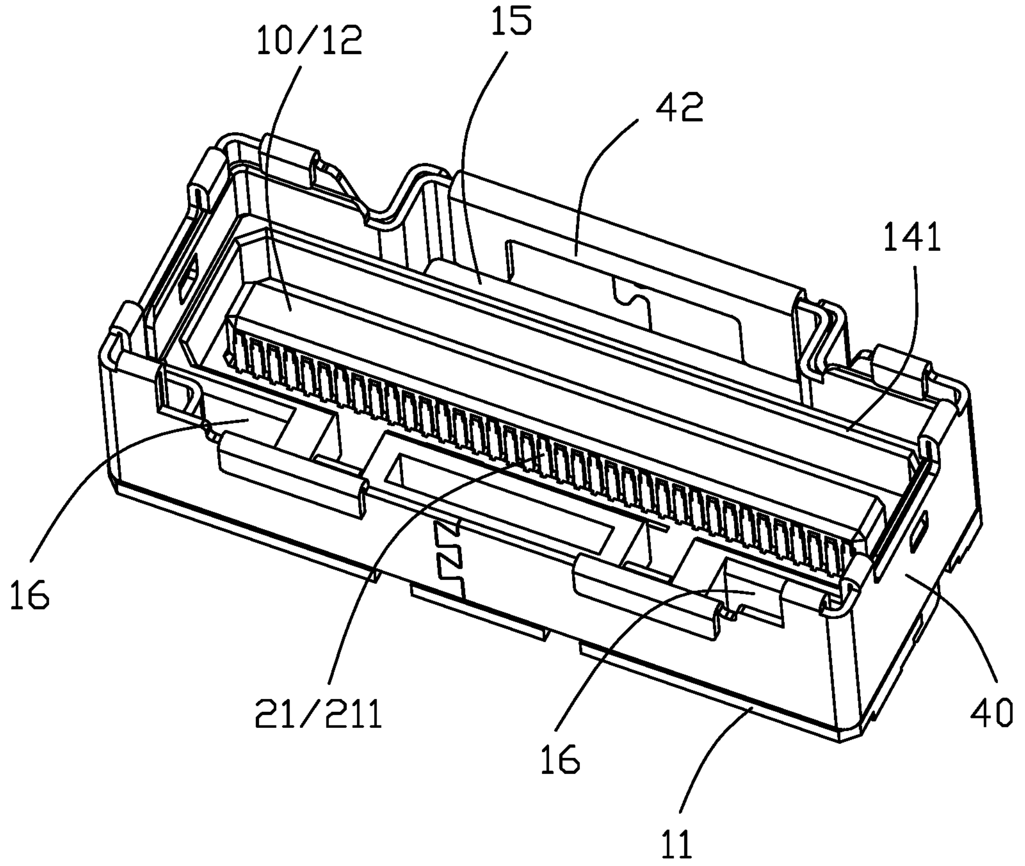
FIG. 3 is a perspective view of the board connector of FIG. 1.
Figure 7:
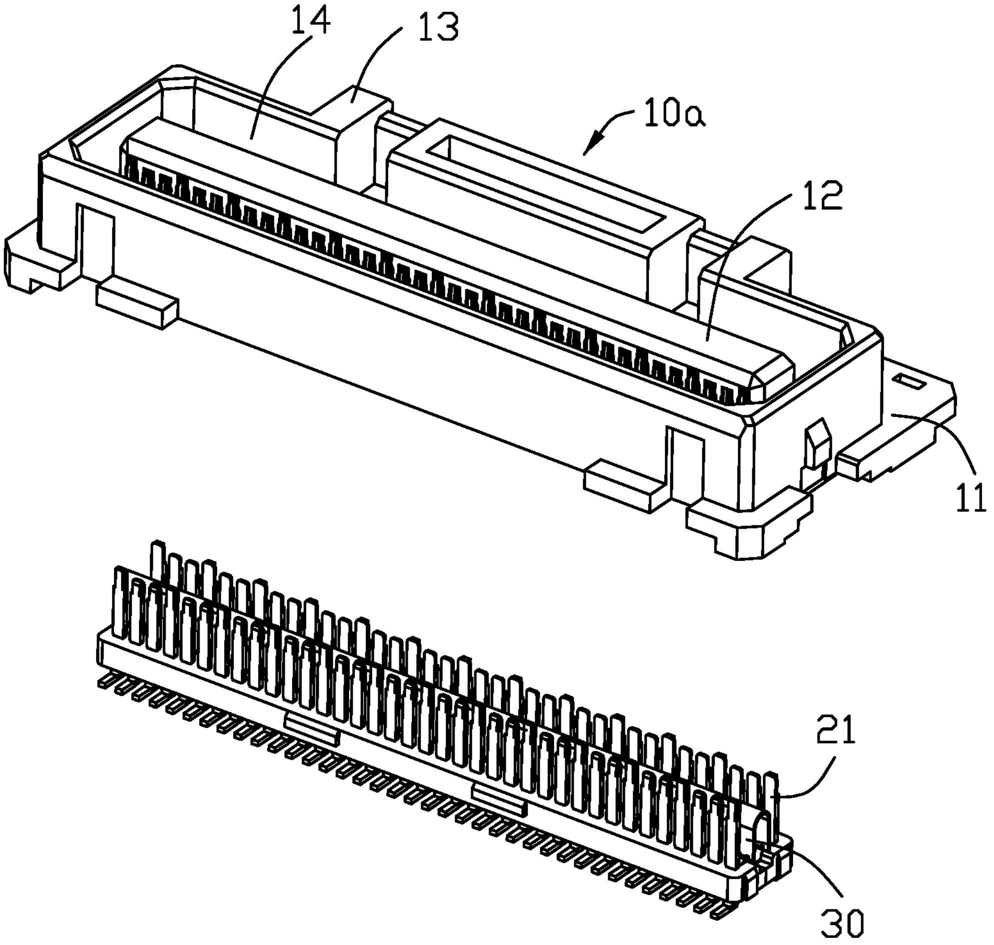
FIG. 7 is a further exploded perspective view of the board connector without the metal shell of FIG. 6.

Referring to FIGS. 2-3 and 7, the board connector 100 comprises a housing 10 with a base portion 11 and a tongue portion 12 extending from the base portion, a metal shell 40, and two rows of terminals and a grounding member 30. Combining with FIG. 9, terminals of each row comprise signal terminals 21S and ground terminals 21G, each terminal comprises a plate contacting portion 211, a tail portion 213, and an intermediate portion 212 connecting the contacting portion 211 and the tail portion 213. The contacting portions 211 of the two rows of terminals are flat plates and are arranged on the opposite surfaces of the tongue portion 12 respectively. The grounding member 30 is formed by bending a metal plate and forms two long plates 31 parallel to each other and an arc portion 32 between and connecting with the two long plates 31 integrally. Each of the long plates 31 defines a plurality of fingers 33, and the fingers 33 are in contact with the corresponding ground terminals 21G one by one. Combining with FIG. 2, since the two long plates 31 of the grounding member 30 are connected by the arc portion 32, the long plates 31 are squeezed by the inner wall surface of the base portion 11 after the grounding member 30 is inserted into the base portion 11. Therefore, the grounding member 30 is elastically deformed and pre-pressured, resulting in the fingers 33 tightly abutting against the ground terminals 21G to avoid loosening.

Figure 9:
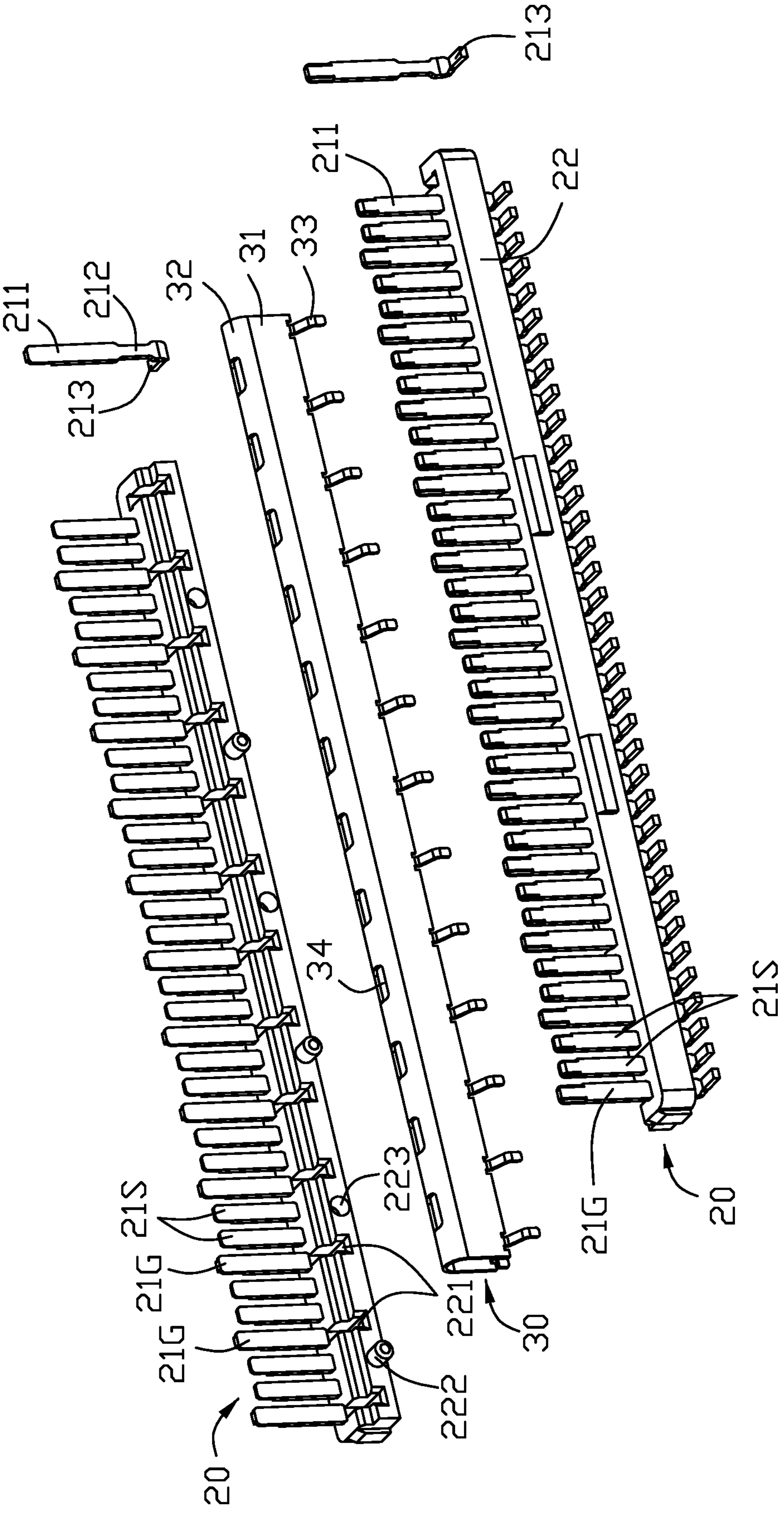
FIG. 9 is an exploded perspective view of the terminal module and the grounding member of FIG. 7.
Figure 10:
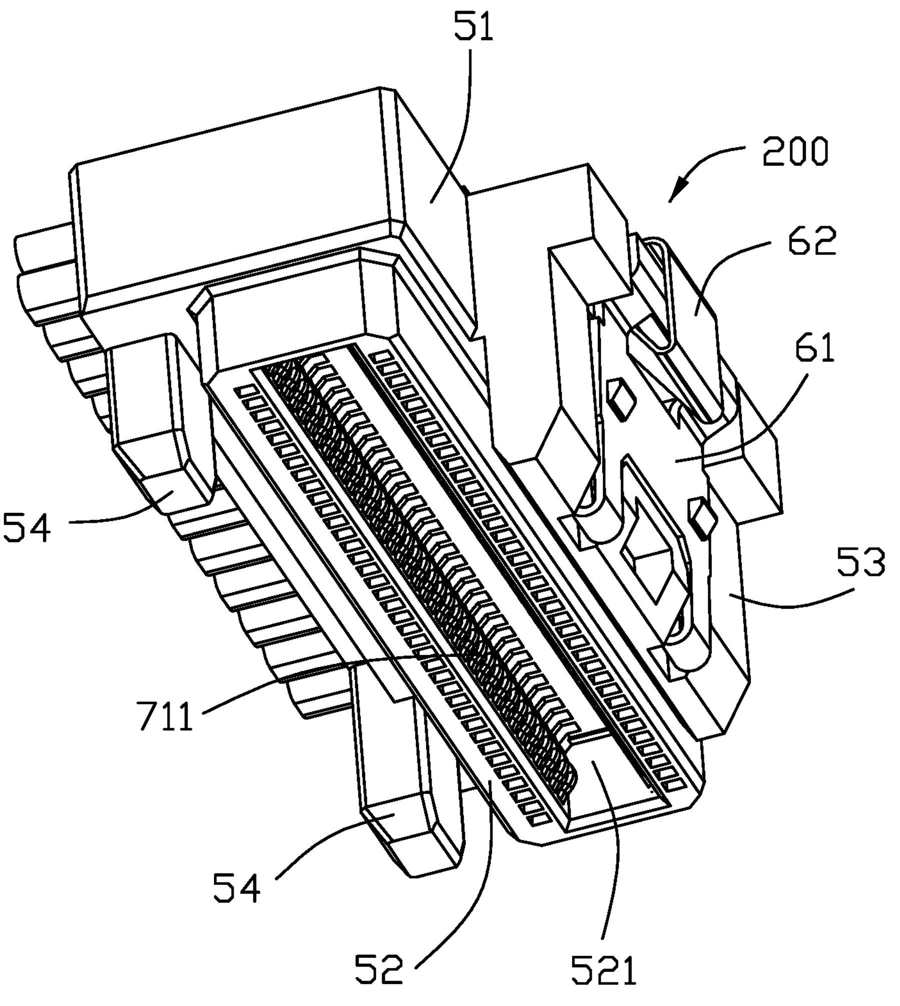
FIG. 10 is a perspective view of the cable connector of FIG. 1.
Figure 11:
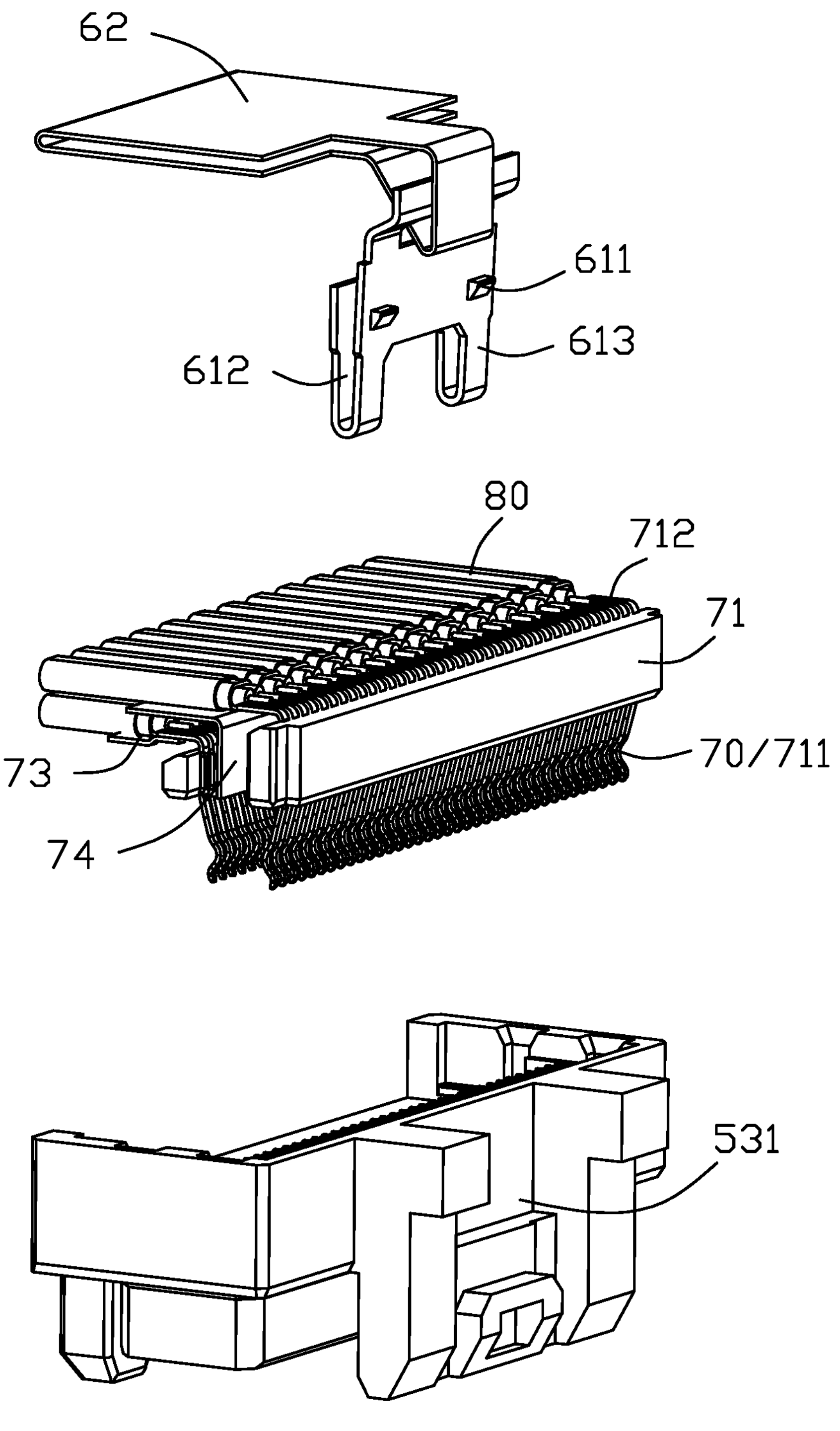
FIG. 11 is an exploded perspective view of the cable connector of FIG. 10.
Figure 12:
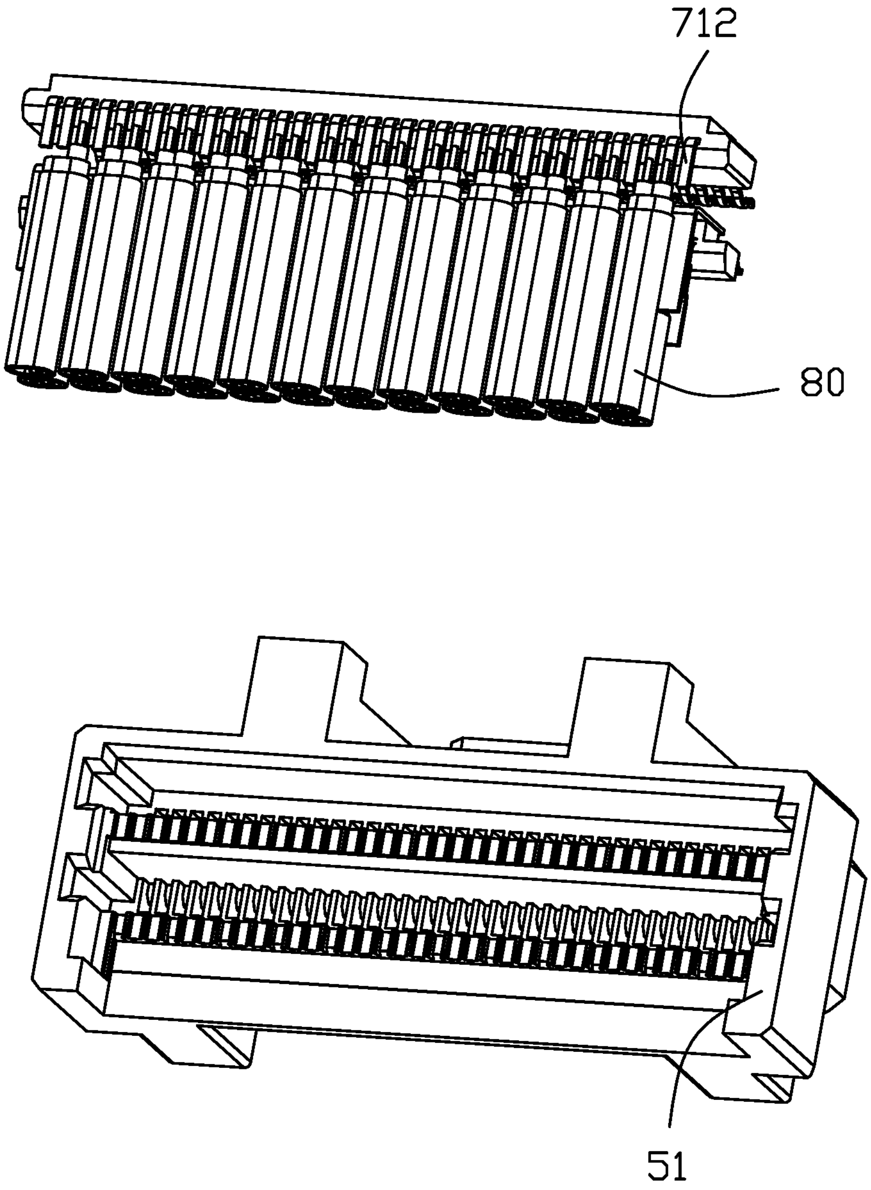
FIG. 12 is another exploded perspective view of FIG. 10 without the latch and the drawstring.
Figure 13:
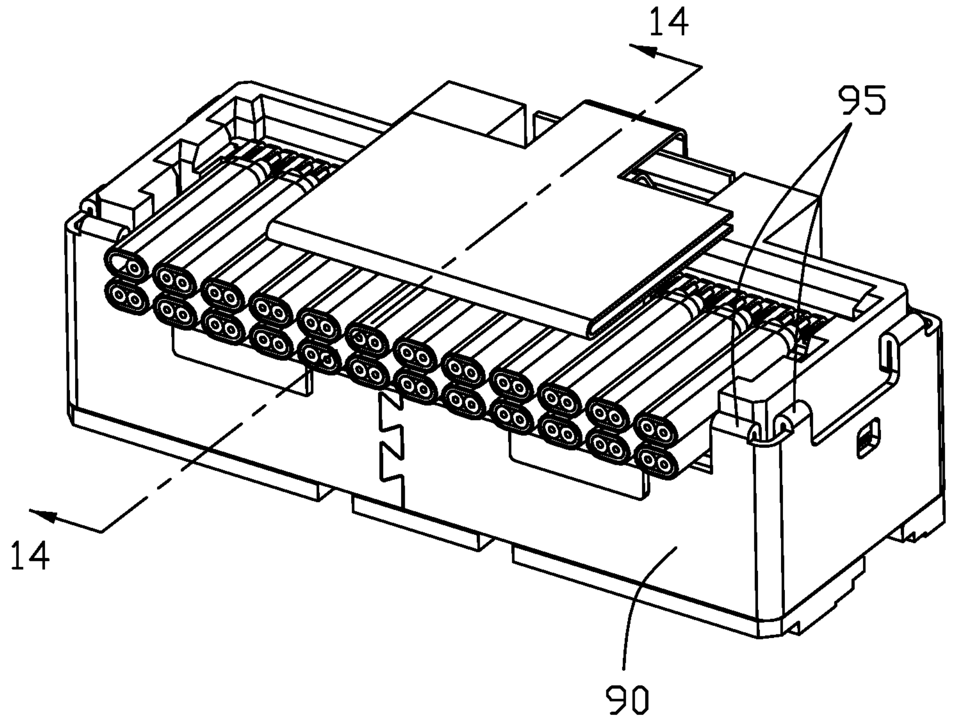
FIG. 13 is a perspective view of an electrical connector assembly of a second embodiment according to the present invention, which includes a board connector and a cable connector mated with each other.

Referring to FIG. 9, each row of the terminals 21*s* is inserted mold with an insulative block 22, forming a terminal module 20. The contact portions 211 extend upwardly out of the insulating block 22, the tail portions 213 extend downward from a bottom surface of the insulating block 22 and the middle portions 212 are embedded in the insulating block 22. The insulating block 22 defines a plurality of slots 221, the middle portions 212 of the ground terminals 21G are exposed in the slots 221, and the fingers 33 pass through the slots 221 and abut against the corresponding middle portions 212 of the ground terminals 21G.

The insulating blocks 22 of the two terminal modules 20 are provided with cylinders 222 and/or holes 223 on confronting surfaces of each other. After the two terminal modules 20 are assembled towards each other, the cylinders 222 of one of the terminal modules 20 are inserted and fixed in the round holes 223 of the other terminal module to realize a fixation of the two terminal modules 20. Then the grounding member 30 is assembled downwardly between the two rows of terminals 21 until the fingers 33 enter into the corresponding slots 221 respectively. Meanwhile, the long plates 31 are located between the two rows of terminals and are spaced apart from each row of terminals at a certain distance to avoid an accidental contact with the terminals. The shape of the finger 33 is designed for suitably located in the slot 221. More specifically, the fingers 33 extend and bend obliquely from a bottom edge of the corresponding long plate 31. The finger 33 has an obliquely extending portion and a vertically extending portion, the obliquely extending portion extends obliquely and outwardly from the bottom edge of the long plate 31 and passes through the slot 221 firstly, and then the vertically extending portion extends vertically downward from the obliquely extending portion continually and abuts against the corresponding ground terminal 21G, which is clearly seen in FIG. 2.

Figure 6:
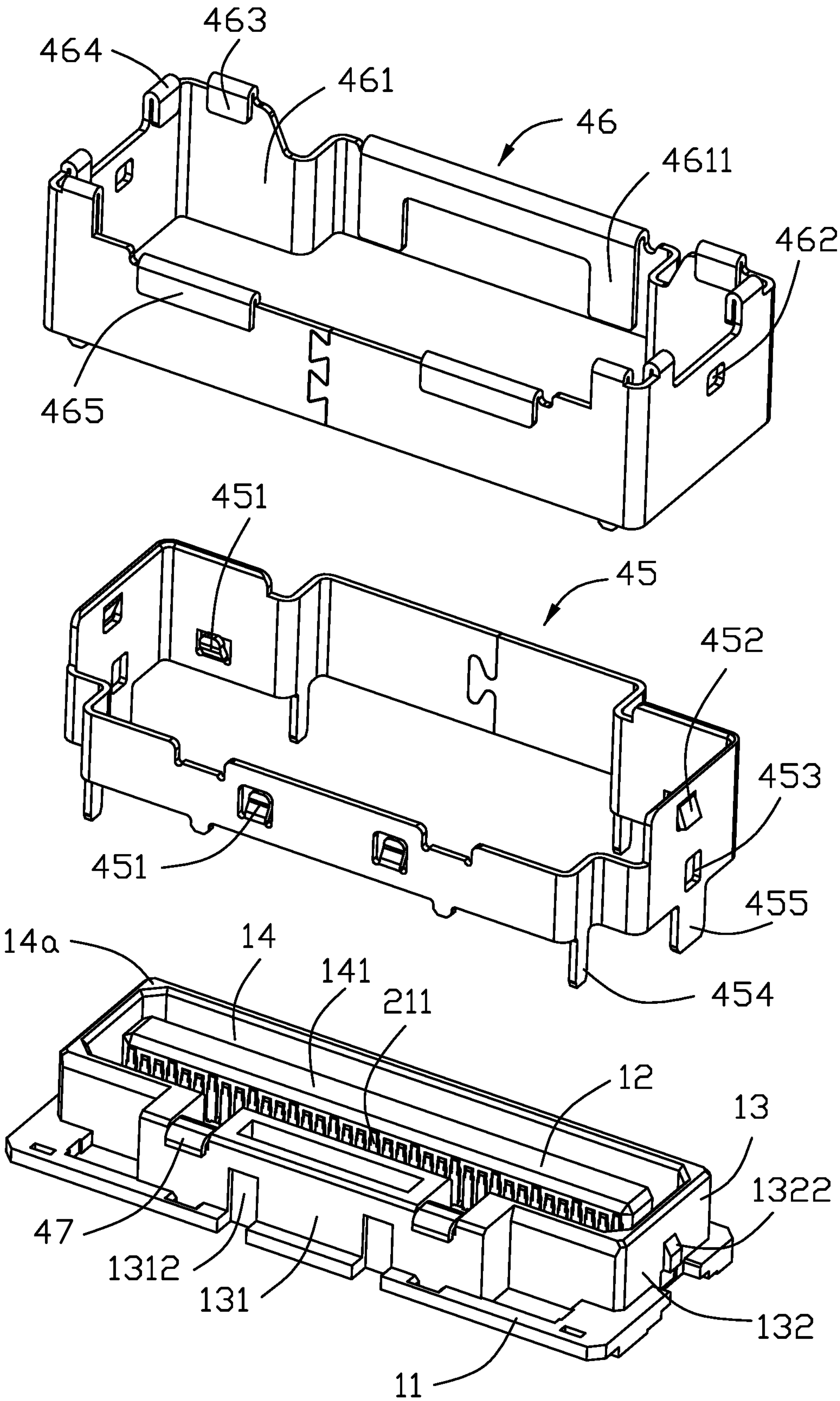
FIG. 6 is a further exploded perspective view of the board connector of FIG. 3.
Figure 8:
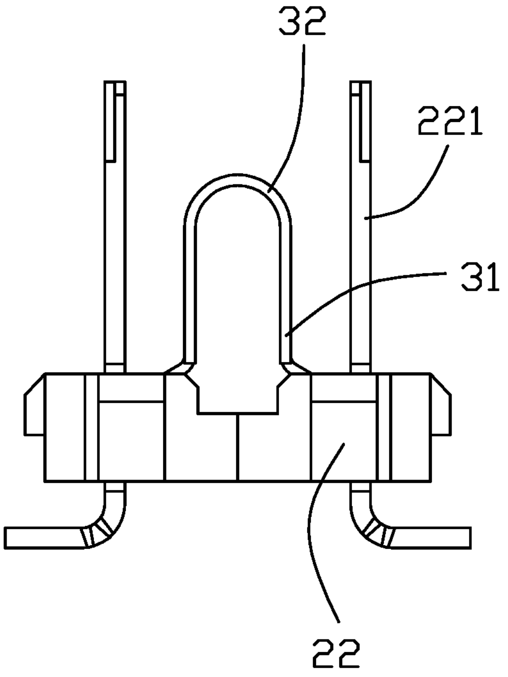
FIG. 8 is a side elevational view of the terminal module and the grounding member in FIG. 7.

Referring to FIGS. 6-8, in this embodiment the housing 10 includes an insulating housing 10*a* into which the two terminals modules are assembled. The insulating housing 10*a* comprises a surrounding wall 13 which is composed of four side walls, the four side walls surround the tongue portion 12 but spaced apart from the tongue portion 12, thereby defining a receiving cavity 14. The insulating housing 10*a* has a receiving cavity extending from the base portion 11 to the tongue portion 12 and opening downwardly, the tongue portion 12 has terminal grooves (not numbered) on two opposite surfaces thereof. After the two bond terminal modules 20 are installed into the receiving cavity from the bottom surface of the base portion 11, the contacting portions 211 of the two rows of terminals 21 are accommodated in the terminal grooves. Therefore, the insulating housing 10*a* together with the insulating block 22 commonly form the housing 10 loaded with the terminals 21 and the grounding member 30 thereon.

Referring to FIG. 8, the long plate 31 extends in an upper-down direction and a lateral direction, which extends downward near to the insulating block 22 and extends upward approximately to the contacting portions 211 of the terminals 21 so as to achieve a good shielding effect between the two rows of terminal. In this embodiment, the fingers 33 contact the ground terminals 21G to improve a resonance range of the board connector 100, the long plates 31 provide a shielding effect between the two rows of terminals 21 and the arc portion 32 increases an elastic force of the grounding member 30. The top of the grounding member 30 (that is the arc portion 32) defines a plurality of openings 34 for decreasing a tension of the metal sheet and facilitating an arc folding of the grounding member 30.

Figure 4:
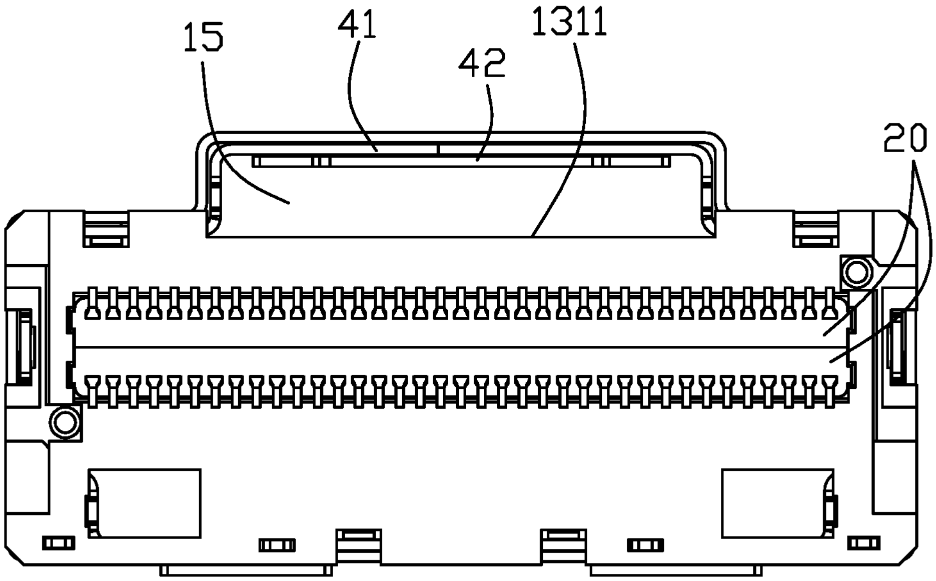
FIG. 4 is a bottom elevational view of the board connector of FIG. 3.
Figure 5:
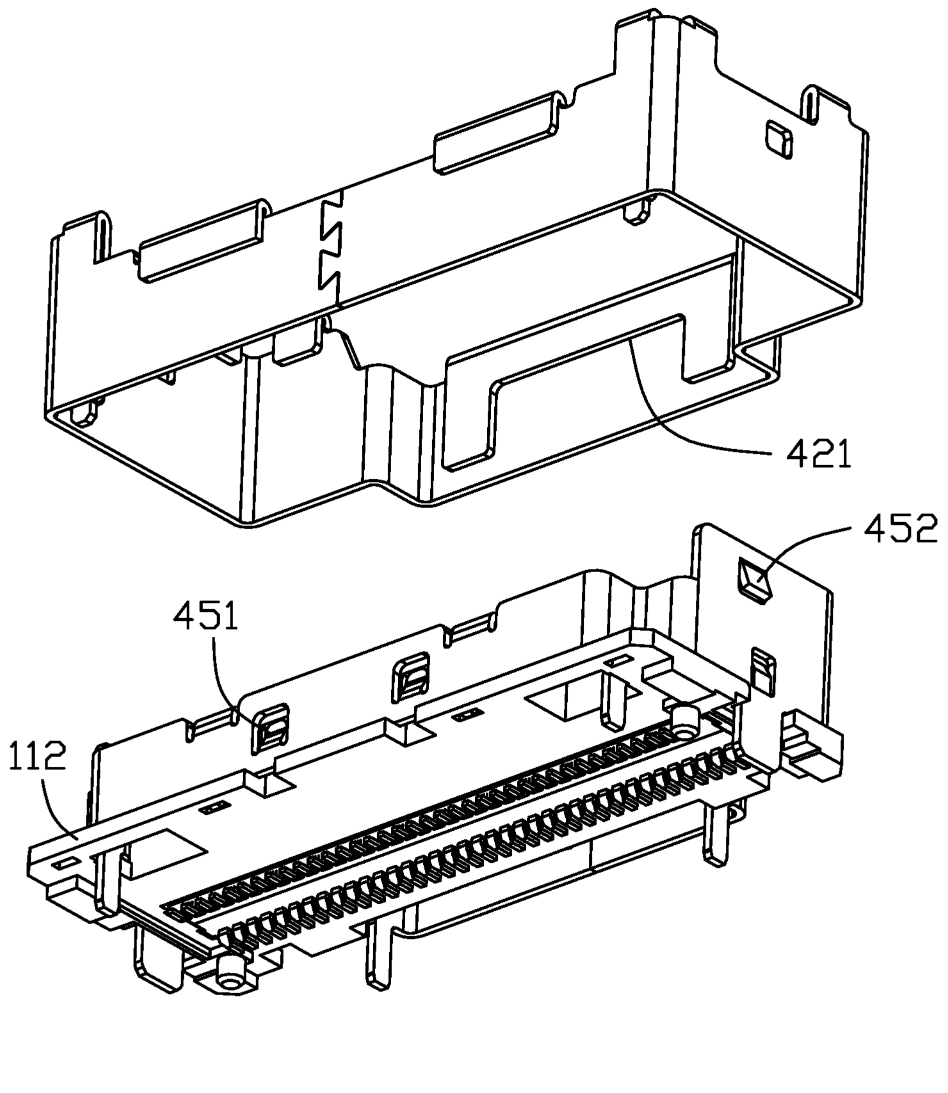
FIG. 5 is an exploded perspective view of the board connector of FIG. 3, wherein an outer shell is taken from the board connector.

Referring to FIGS. 5-6, the metal shell 40 surrounds the insulating housing 10*a* and attached to an outer periphery of the surrounding walls. A mating portion 14*a* is defined around the tongue portion 12 and the surrounding wall 13, which defines a mating face 141 confronting with the cable connector, at a top end of the mating portion 14*a*. In alternate embodiment, the mating face may be at a front face or the like. In this embodiment, the surrounding wall 13 is formed by connecting four end-to-end side walls integrally and comprises two long side walls 131 and two short side walls 132 on which the metal shell 40 closely covers. As shown in FIG. 3, the metal shell 40 extends upward beyond the mating face 141 of the mating portion 14*a* providing a positioning and guiding function during an connecting engagement of the cable connector 200 and the board connector 100. Combining FIGS. 3-4, an outer face of one of the long side walls 131 is defined as an first outer face 1311, the metal shell 40 comprises a first side plate 41 which is at least partially spaced apart from the first outer face 1311 with a certain distance, and a positioning groove 15 is defined between the first side plate 41 and the first outer face 1311. The metal shell 40 comprises an inner plate 42 that bends inwardly into the positioning groove 15 and attach the first side plate 41. In addition, a lower edge of the inner plate 42 is cut into a specific shape to form a locking edge 421 which is used for locking with a locking head 611 of the locking member 61 of the cable connector 200 (clearly visible in FIG. 2) and will be described in detail below. Forming the locking edge 421 on the inner plate 42 instead of punching locking holes on the metal shell in the prior art can avoid a risk of damaging an overall shielding and strengthen of the metal shell. So the risk of instantaneous disconnection can be avoided when the cable is improperly pulled, and the stability of the engagement of the two connectors can be improved.

Continue to referring FIGS. 5-6, in this embodiment, the metal shell 40 comprises an inner shell 45 and an outer shell 46, which two are closely attached to each other, the inner shell 45 and the outer shell 46 then are assembled to the housing 10. Each includes two long plates and two short plates. The inner shell 45 defines first lugs 451 on the long plates pressing inwards and upwards in retaining grooves 1312 on the outer face of the surrounding wall 13, second lugs 452 at the short plates fixed in fixing openings 462 on the short plates of the outer shell 46, and openings 453 on the short plates engaging with ribs 1322 on the outer face of the surrounding wall 13 In this way, the inner shell 45 and outer shell 46 are snapped together or riveted together Further, the outer shell 46 and the inner shell can be welded, especially at an engagement edge of two opposite ends of the outer shell or the inner shell. Two welding pieces 47 are added, clamped on the long side walls of the insulating housing 10 and welded with the outer shell 46.

The inner shell 45 comprises a plurality of vertical legs 454, 455 extending downward while the outer shell 46 has no vertical legs. The bottom of the insulating housing 10*a* protrudes outwardly from the surrounding wall 13 in the horizontal direction and forms a skirt 112. The lower side edge of the inner shell 45 abuts against the skirt 112 downwardly. The vertical legs 454, 456 pass through the skirt 112 and are soldered to the circuit board. The upper edge of the outer shell 46 extends inwardly and downwardly and forms bent tabs 463, 464 which locate above the upper edge of the inner shell 45. The long plates of the outer shell 46 defines one bent tab 463 near to opposite lateral ends thereof, the short plates of the outer shell 46 defines one bent tab 464 near to opposite lateral ends thereof, so the bent tabs 463, 464 are adjacent to corners of the long plates and the short plate. The bent tabs 463, 464 can play a guiding role when the cable connector 200 is inserted into the board connector 100. The two-piece metal shell of the present invention can enhance the strength of the metal shell. From the top view, one long plate 461 of the out shell 46 protrudes outwardly and keeps a certain distance from the first outer face 1311 of the long side wall 131 of the surrounding wall so as to form the positioning groove 15. The inner plate 42 fold inwardly from a top edge of the long plate 461, third bent tab 465 fold outwards from a top edge of the other long plate of the outer shell 46.

Referring to FIGS. 10-14, the cable connector 200 includes a base portion 51, a mating portion 52 protruding from the base portion 51, a positioning board 53 at one side of mating portion 52, a pair of positioning posts 54 at another side of the mating portion 52, a locking member 61, a pull strap 62, terminals 70 and cables 80. The base portion 51, the abutting portion 52, the positioning plate 53 and the positioning posts 54 are integrally injection-molded from insulating materials. The abutting portion 52 includes four sidewalls and a receiving groove 521 surrounded by the four sidewalls. The terminals 70 are divided into two rows, and each row of terminals 70 is molded with an insulating block 71 to form a terminal module. Each terminal 70 includes an elastic contacting portion 711 and a connecting portion 712 protruding out of the insulating block 71. The terminal module is inserted into the base portion 51 from the top to the bottom (seen in FIG. 11), and the contacting portions 711 of the terminals pass through the base portion 51 downwardly and are arranged in the receiving groove 521. The cables 80 are soldered with the connecting portions 712, and two grounding plates 73 and 74 are respectively arranged on the sides of the connecting portions 712, playing a role of shielding and grounding. The positioning post 54 and the locking member 61 are respectively located on the opposite sides of the receiving groove 521.

The locking member 61 is installed in a recess 531 on the positioning board 53 and has two locking protrusions 611. The locking member 61 includes a fixing portion 612 fixed in the recess 531 and an elastic portion 613 bending reversely from the lower edge of the fixing portion 612. The locking protrusions 611 are formed by protruding outwardly from the elastic portion 613, a drawstring 62 goes through an opening on the elastic portion 613 and extends along an extending direction of the cable 80. Combined with FIG. 2, the locking protrusion 611 abuts against the locking edge 421 of the inner plate 42 of the board connector 100, so as to avoid a risk of instantaneous disconnection when the cable is improperly pulled.

FIGS. 13-16 show an electrical connector assembly of a second embodiment of the present invention, which is substantially as same as that of the first embodiment in structure. Only the main differences are described below, the same components use the same symbols and will not be described in detail again. The metal shell 90 is constituted by the outer shell alone and the inner shell is not provided. The housing 10 defines a mating face 141 for docking with the cable connector 200 and a first outer face 1311 of the long side walls 131. The metal shell 90 includes a first long plate 91 at least partially spaced apart from the first outer face 1311 with a certain distance. Therefore, a positioning groove 93 is defined between the first long plate 91 and the outer face of the insulating housing 10. The metal shell 90 is further provided with an inner plate 92 which is bent inwardly into the positioning groove 93 and located at the inner side of the first plate 91, the lower edge of the inner plate 92 is cut into a specific shape to form a locking edge 921 against with the locking protrusions 611. In this embodiment, the inner plate 92 and the first side plate 91 are not in a close contact but with a certain interval between them. Alternatively, the inner plate 42 and the first plate 91 can also be closely contact with each other.

In the second embodiment of the present invention, it's shown that the positioning groove 93 is defined between the first outer face 1311 and the first side plate 91 of the metal shell 90, so the board connector is widened at one side of the housing 10. In order to keep the balance of the board connector 100 in a width direction, another long side wall 132 opposite to the positioning groove 93 has a wider dimension at a middle position thereof and forms an convex portion 1320 (seen in FIG. 6). Two positioning holes 94 are formed between the long side wall 132 of the surrounding wall 13 and the metal shell 90, which are located on two opposite lateral sides of the convex portion 1320 respectively. After the board connector and the cable connector 200 are mated, the positioning board 53 is inserted into the positioning groove 93, the locking protrusion 611 is locked with the locking edge 921, and the two positioning posts 54 are inserted into the corresponding positioning holes 94. Referring to the first embodiment shown in FIG. 3, two positioning holes 16 for cooperating with the positioning posts 54 are also formed in the inner shell 45 and the outer shell 46.

Figure 14:
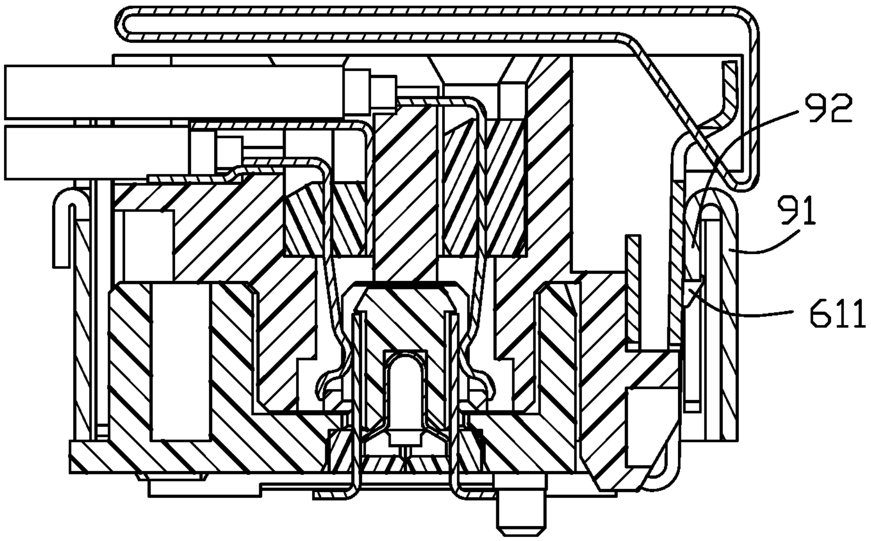
FIG. 14 is a cross-sectional view of the electrical connector assembly taken along the line 14-14 of FIG. 13.
Figure 15:
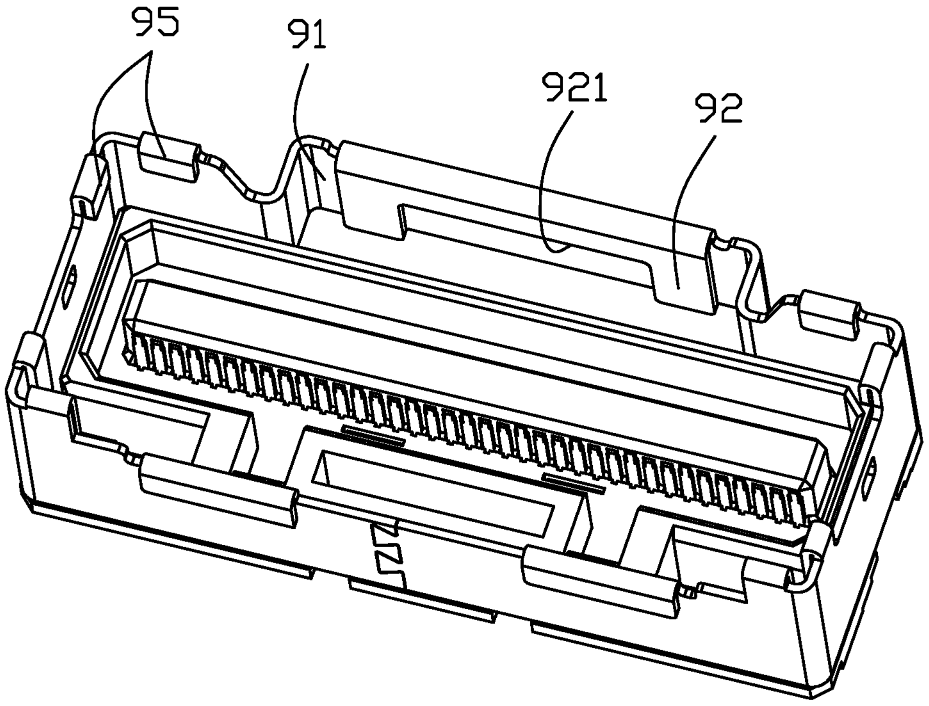
FIG. 15 is a perspective view of the board connector of FIG. 13.
Figure 16:
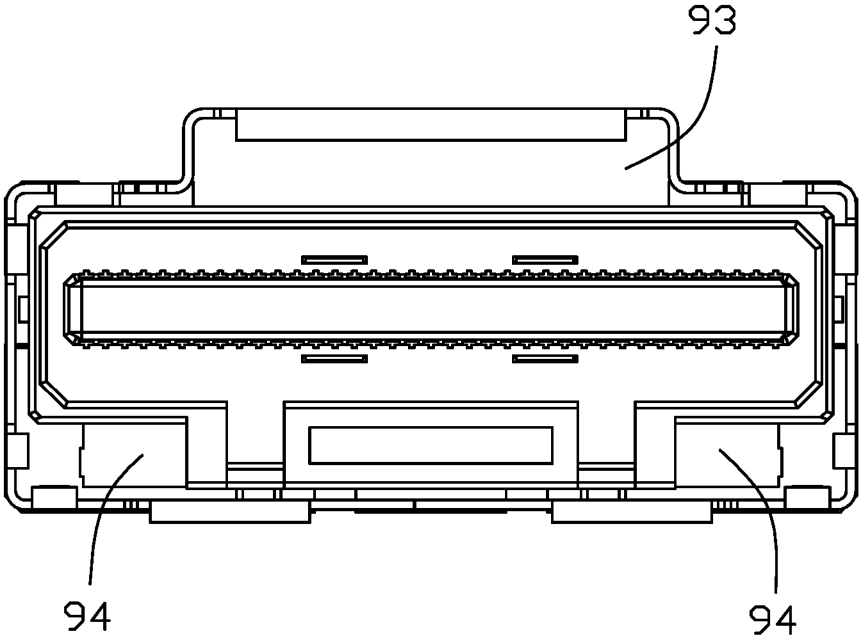
FIG. 16 is a top elevational view of the board end connector of FIG. 15.

It can be seen from FIG. 3 and FIG. 16 that the metal shells 40 and 90 both protrude upward from the mating face 141. In FIG. 1 and FIG. 3, it can be seen that the outer shell 46 extends upward from the inner shell 45, the four pairs of bending tabs 463, 464 located at the corners can guide the insertion of the cable connector 200, and can further refine the movement of the cable connector for making the engagement of the two connectors more stable after the cable connector is mated with the board connector. In FIG. 14 and FIG. 16, the four pairs of inner bending tabs 95 are located at the corners can guide the insertion of the cable connector too.

The above-mentioned embodiments are only preferred embodiments of the present invention, and should not limit the scope of the present invention, any simple equivalent changes and modifications made according to the claims of the present invention and the contents of the description should still belong to the present invention.

The invention claimed is:

1. An electrical connector comprising:

a housing comprising a base portion and a tongue portion extending from the base portion;

two rows of terminals retained in the housing, each row of terminals comprising signal terminals and ground terminals, each terminal having a contacting portion and a connecting portion, the contacting portions being respectively arranged on opposite surfaces of the tongue portion; and a grounding member retained in the housing and located between the two rows of terminals;

wherein the grounding member is formed by bending a metal plate and comprises two long plates and an arc portion integrally connecting the two long plates, and each of the long plates defines a plurality of fingers in contact with corresponding ground terminals, respectively.

2. The electrical connector as claimed in claim 1, wherein the electrical connector comprises two terminal modules, each of the terminal modules comprises one row of terminals and an insulating block retaining the row of terminals, the insulating block defines a plurality of slots, and the fingers pass through corresponding slots and press against corresponding ground terminals.

3. The electrical connector as claimed in claim 2, wherein the finger has an oblique portion and a vertical portion, the oblique portion extends outwards from a bottom edge of the long plate and passes through the slot, and the vertical portion extends vertically downward from the oblique portion continually and abuts against the corresponding ground terminal.

4. The electrical connector as claimed in claim 1, wherein the arc portion defines a plurality of openings.

5. The electrical connector as claimed in claim 1, wherein the electrical connector comprises two terminal modules, each terminal module comprises an insulating block and one row of the terminals retained in the insulating block, the long plates reach downwards to the insulating blocks and upwards approximately to the contacting portions of the terminals.

6. An electrical connector comprising:

a housing defining a mating face and a first outer face perpendicular to a vertical direction;

a plurality of terminals arranged in the housing; and a metal shell surrounding the housing and comprising a first side plate at least partially spaced apart from the first outer face with a certain distance to define a positioning groove between the first side plate and the first outer face of the housing;

wherein the metal shell comprises an inner plate bent into the positioning groove integrally from the first side plate, the inner plate defines a locking edge for locking with a locking member of a mating connector, and the inner plate is cut into a specific shape to form a locking edge.

7. The electrical connector as claimed in claim 6, wherein a lower edge of the inner plate is cut into a specific shape to form the locking edge.

8. The electrical connector as claimed in claim 6, wherein the metal shell extends upwardly beyond the mating face of the housing and defines a plurality of bending tabs bent inwardly from an upper edge of the metal shell.

9. The electrical connector as claimed in claim 6, wherein the metal shell comprises an inner shell and an outer shell closely attached to each other, and the inner plate bent inwardly from an upper edge of the outer shell.

10. The electrical connector as claimed in claim 9, wherein the bending tabs are bent inwardly from the outer shell and are located above the inner shell.

11. The electrical connector as claimed in claim 9, wherein the outer shell comprises bending tabs bent outwardly from an upper edge of the other side plate opposite to the first side plate.

12. The electrical connector as claimed in claim 6, wherein the housing comprises a base portion and a tongue portion and a surrounding wall extending from the base portion and spaced apart from each other, and the surrounding wall defines the first outer face.

13. An electrical connector comprising:

a housing and two rows of terminals retained in the housing, each row of terminals comprising signal terminals and ground terminals; and a grounding member retained in the housing and located between the two rows of terminals;

wherein the grounding member is made from a metal plate and comprises two long plates located proximal to corresponding rows of the terminals and a connecting portion integrally connecting respective first ends of the two long plates, the long plates define a plurality of fingers extending from respective second end thereof opposite to the first ends, and the fingers mechanically connects with the ground terminals of corresponding rows of terminals, respectively.

14. The electrical connector as claimed in claim 13, wherein the connecting portion is in an arc shape and defines a plurality of openings.

15. The electrical connector as claimed in claim 13, wherein there are two terminal modules each comprising an insulating block and one row of terminals, and the fingers pass through slots defined on the insulating blocks and contact the grounding terminals.

16. The electrical connector as claimed in claim 13, further comprising an inner shell and outer shell, wherein the inner shell is fittingly attached to the housing and the outer shell is fittingly attached to the inner shell, and wherein the outer shell defines a plurality of inner bending tabs located above the inner shell.

17. The electrical connector as claimed in claim 16, further comprising an inner plate, wherein the inner plate is folded from the outer shell and attached to an inner side of the inner shell, and the inner plate defines a locking edge.

18. The electrical connector as claimed in claim 13, further comprising a metal shell fittingly surrounding the insulating housing and defining a positioning groove between a part of the metal shell and the housing, and an inner plate attached to an inner side of the metal shell and defining a locking edge.

* * * * *